United States Patent [19]

Smith et al.

[11] 3,912,240

[45] Oct. 14, 1975

[54] METHOD AND APPARATUS FOR EXTRUDING PLASTIC PIPE AND THE LIKE

[75] Inventors: Roger Dallas Smith, Bethel; Herbert Karl Maar, Cincinnati, both of Ohio

[73] Assignee: Cincinnati Milacron, Inc., Cincinnati, Ohio

[22] Filed: July 9, 1973

[21] Appl. No.: 377,764

[52] U.S. Cl. ................. 259/185; 425/376; 425/380
[51] Int. Cl. .............................................. B29d 23/04
[58] Field of Search .......... 425/378, 379, 380, 376; 259/190, 185

[56] References Cited
UNITED STATES PATENTS

| | | | |
|---|---|---|---|
| 3,432,886 | 3/1969 | Haley | 425/376 |
| 3,583,034 | 6/1971 | Colombo | 425/380 |

*Primary Examiner*—Harvey C. Hornsby
*Assistant Examiner*—Robert Pous
*Attorney, Agent, or Firm*—Daniel P. Worth

[57] ABSTRACT

The conventional spider is eliminated in a system for extruding plastic pipe where the plastic turns and flows radially from its admission point into the die head through a radial flow path containing a radial array of torpedoes so arranged to function as substantially non-loadbearing spacing bodies, thence turns again and is passed through an annulus which may contain a restrictor, and thereafter into and through an annular pipe die set. The new die head system provides a flow path between flat surfaces joining the spacing bodies at right angles enabling simple and better machining and also reduces or eliminates die marks on the product.

6 Claims, 5 Drawing Figures

METHOD AND APPARATUS FOR EXTRUDING PLASTIC PIPE AND THE LIKE

FIELD OF THE INVENTION

This invention relates to improvements in method and apparatus for extruding plastic pipe and the like. An aspect of the invention relates to an improved die head in a system where the complete unit includes a die head combined with a die set on the downstream end thereof. An aspect of the invention concerns method and apparatus wherein an incoming flow of plastic material is redirected to flow radially outwardly (preferably in a radial direction perpendicular to the incoming stream) through a flow path between preferably substantially flat surfaces that include an array of streamlined bodies that act as spacers between the substantially flat surfaces of the die head and then changing the direction of flow again (preferably perpendicular to the radial path and in the direction of the of the original inlet flow). An aspect of the invention is method and apparatus for extruding pipe of thermoplastic materials in connection with which polyvinyl chloride will be used to describe but not necessarily to limit the invention thereto.

BACKGROUND OF THE INVENTION

The prior art of extruding pipe from plastic materials involves using a unit or assembly having a mandrel centrally suspended in the flow path by a spider. A spider looks like a cast wheel having a hub, spokes, and an outer rim. The spokes serve to actually support the mandrel (corresponding to the wheel hub) centrally, but being interposed in the annular flow stream, form seams (spider lines) in the pipe ultimately coming out of the die. These seams, in turn, are longitudinal deep cuts (e.g., in pipe above one-half inch wall thickness spider lines 0.010 inches deep have been frequently formed) and form lines of stress concentration along which failure of the plastic pipe often occurs. This is particularly true with polyvinyl chloride pipe because of a need to process it at a low temperature and in a narrow temperature range to avoid burning and decomposing it. The conventional construction of dies using spiders for use in making plastic pipe and tubing is set forth in several well-known texts and handbooks. For example, American Elsevier Publishing Company "Plastic Extrusion Technology and Theory" by Gerhard Schenkel 1963, 1966 in Chapter 9 beginning on page 281 describes not only equipment but specifically comments on the aforesaid type of spider, die, and the problems thereof. A large number of die designs all employing spiders of the aforesaid nature are also known in Wiley "Extrusion of Plastics" (Second Ed.) 1964 at Chapter 8.

It is characteristic of these prior art designs that the spiders are stressed, i.e., loadbearing in that the high pressure of the plastic material tends to expand the die outwardly because of pressure against the outer ring of the spider.

The prior art spiders present severe manufacturing difficulties in that they require high quality forging or castings which often require hand finishing in order to provide smooth surfaces on the spaces between the spokes. In fact, as small a radius as possible is desired at the place where the spokes of the spider join the hub or the outer ring because the smaller the radius, the less severe any seams would be in the final product. Ideally, of course, a square corner with surfaces at 90° would be desired, but manufacturing difficulties have precluded achieving this ideal.

SUMMARY OF THE INVENTION

The present invention has an objective of providing an improved method and apparatus for extruding a pipe. Another objective is to provide a structure that is readily machined. A further objective is to improve the quality of the pipe by reducing, in some instances often eliminating, the seams or longitudinal defects that have characterized the product of prior art means.

The invention relates to a die head to which a die set is intended to be attached to form a die assembly or unit for use in extrusion of plastic pipe. Such a die head includes a housing assembly that has a recess at the bottom of which is a radial inlet surface and connected thereto walls leading into the recess that form an annulus surface. A die head mandrel support assembly is within the recess and has as its major outside surfaces a radial inlet surface on one end, a radial die set mounting surface on the opposite and downstream end, and an annulus surfacing connecting them. The mandrel support assembly is so located or disposed within the recess that the aforesaid inlet surfaces are spaced apart and face each other to form a radial inlet passage. By the same arrangement the respective annulus surfaces are spaced apart and face each other to form an annular passage that is connected to the downstream peripheral end of the aforementioned radial inlet passage. A plurality of torpedoes or spacer blocks each having substantially flat mounting surfaces is radially disposed between and spaces apart the respective inlet surfaces. The respective inlet surfaces are flat where each is engaged by the torpedoes.

A process for extruding pipe and similar long hollow shapes according to the present invention includes the steps of plasticizing the material to be extruded, directing the plasticized material along a first path to a die head that is assembled immediately upstream of or directly to a die set for forming said pipe and the like, and while the plastic is in the die head redirecting the same to flow radially outwardly away from the first flow path and along a second flow path which includes an array of streamlined bodies such as the torpedoes secured therein, followed by guiding the material to the end of said second flow path, into an annular flow path which is substantially coaxial with the axis of the first flow path, and then conducting the material through the annular flow path to the die set. The plastic material after passing through and out of the die set has assumed substantially its final form as pipe or the like and then passes through conventional operations of cooling, cutting and storing. In one process embodiment of this invention, the annular flow path referred to has a restriction therein. The class of thermoplastic resins is preferred. The more preferred material for the process is polyvinyl chloride although more broadly it may also include resins selected from the class consisting of halogenated vinyl polymers (polyvinyl chloride, polyvinylidene chloride, polyvinyl fluoride), polyolefins (including mono- and di-olefins such as, respectively, polyethylene and polypropylene on one hand and on the other polybutadiene) and copolymers thereof. It is also preferred that the first flow path between substantially flat radial surfaces and the second annular flow path be substantially circular or cylindrical in character.

A preferred structure for achieving this result has been to use a housing preferably having a flat bottom from which walls extend forwardly and perpendicularly. An internal assembly including a mandrel is supported within the housing, the necessary spacing being obtained by spacer blocks which are herein called torpedoes. The spacer blocks are arranged in a ring around the inlet in the flat bottom of the recess in the housing. The bottom of the flat housing provides a surface that is easy to machine using conventional equipment. The mandrel and mandrel supports to fit therein are likewise readily machined. The torpedoes similarly are readily machined, particularly since they have flat surfaces where they join similar flat surfaces on the housing recess bottom and the mandrel support which faces it. This construction also provides when desired a perpendicular relationship, i.e., sharp corners, between the torpedoes and the surfaces that they adjoin hence minimizes or eliminates seams in the final product.

Other objectives, features, and advantages will be recognized from a reading of the following detailed specification in connection with the following drawing wherein.

Figure 1:
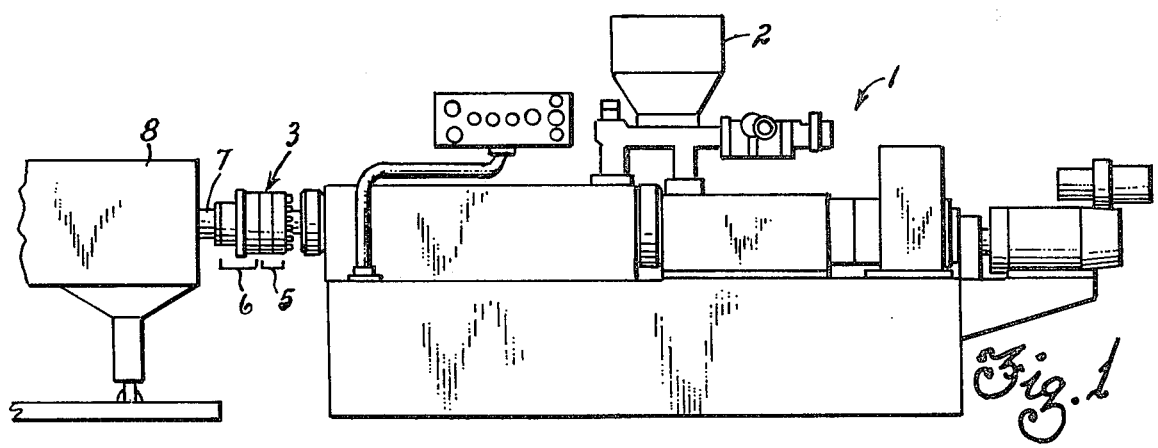
FIG. 1 illustrates a typical pipe extrusion facility.

FIG. 1 shows a typical facility for extruding plastic pipe. This includes an extruder 1 which receives plastic in solid form, normally powder or pelletized, at the hopper 2, masticates and heats it and feeds it out through the die assembly or unit 3 which consists of the die head 5 and die set 6 shown both in FIG. 1 and in more detail in FIG. 2. After the plastic is passed through the die assembly 3 it is fed through a shield 7 while at the same time air pressure is maintained internally in the pipe to maintain its rotundity. From the shield the pipe is sent into one or more cooling zones 8 which typically and preferably comprise water sprays within a tank through which the cooled plastic pipe is passed then to a pull-off or similar conveyor device (not shown), then to a cut off device for cutting the pipe to predetermined lengths (this is often times a saw) to some type of removal, palletizing or stacking device (not shown).

Figure 2:
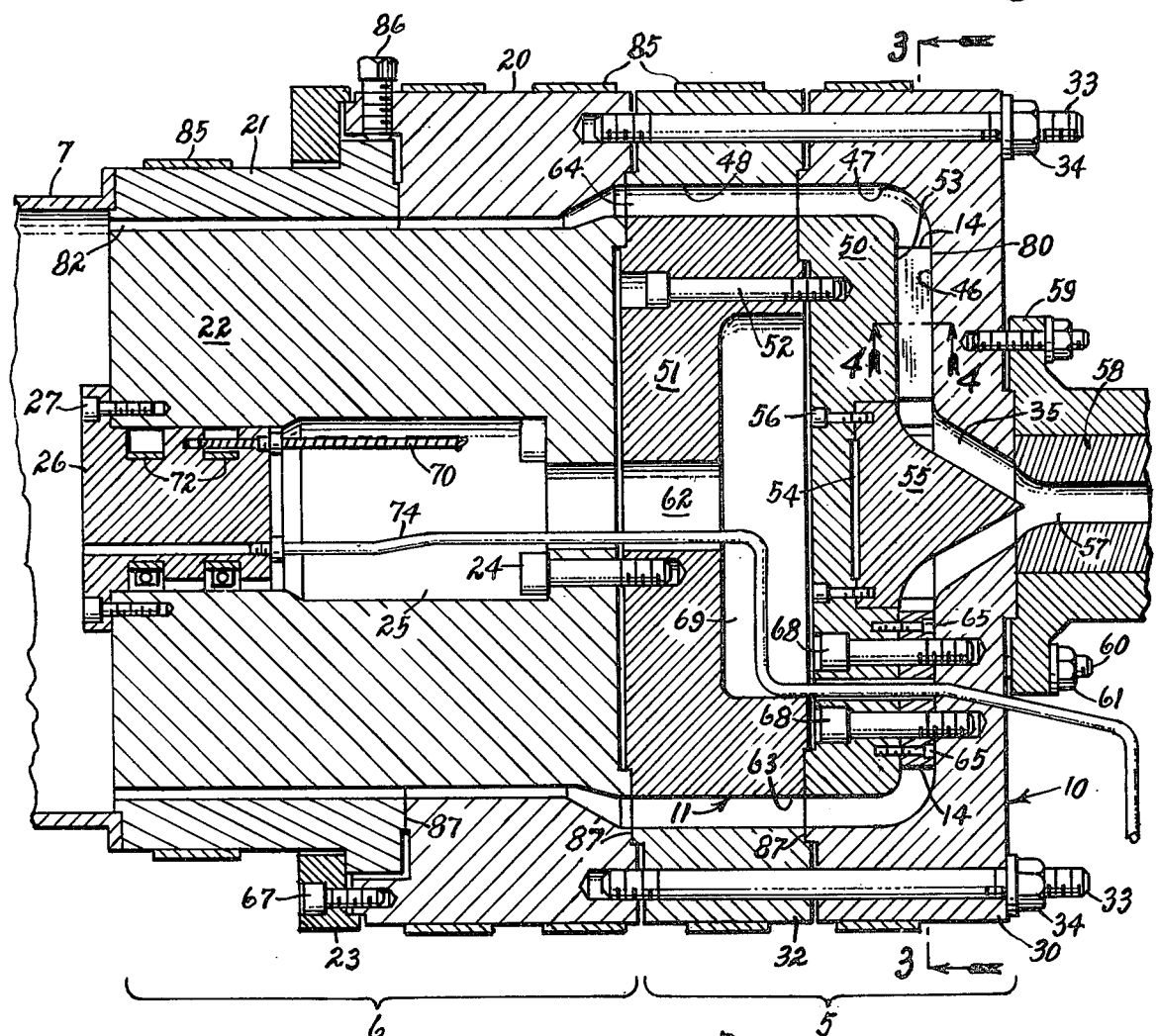
FIG. 2 shows a cross section taken longitudinally along section 2—2 of FIG. 3 and further shows in profile the die head to which the present invention is primarily directed and the die set with which it is combined to form a unit or assembly for use in making pipe.
Figure 3:
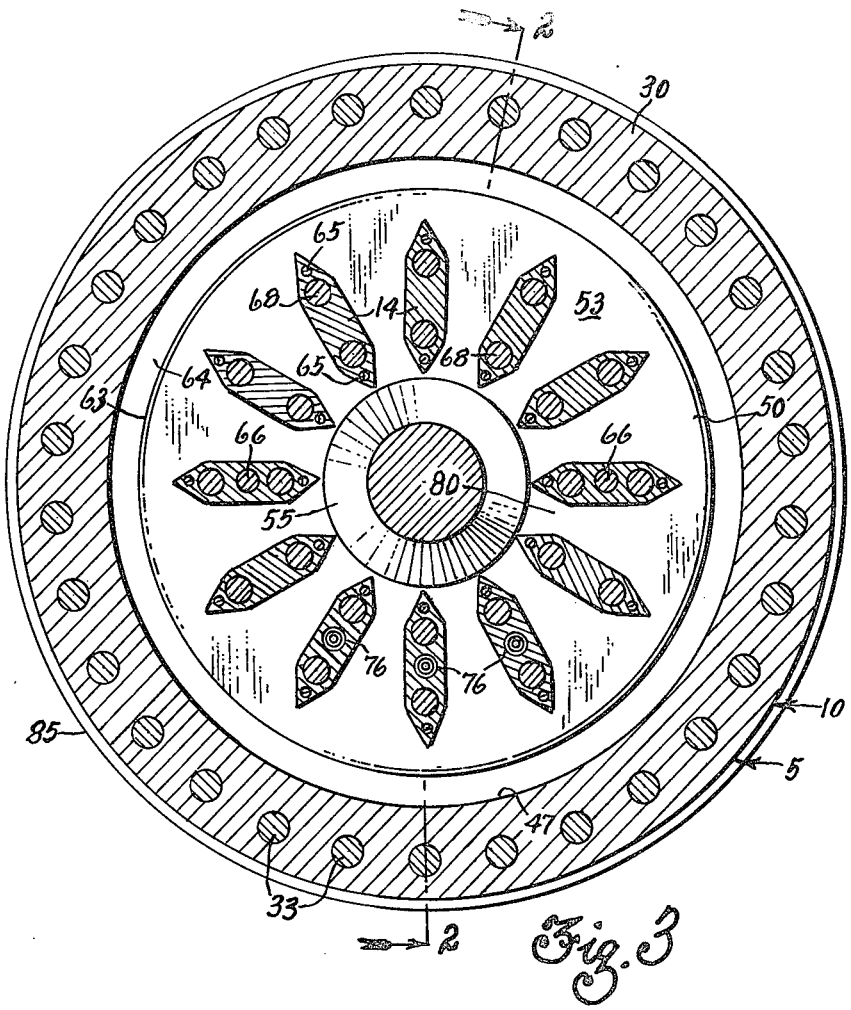
FIG. 3 is a lateral cross section taken along section 3—3 of FIG. 2 and illustrates the shape and alignment means of the torpedoes in the radial flow path.

The present invention relates to the die head 5 illustrated in FIGS. 2 and 3 and shown in FIG. 1 as part of the unit assembly head 3. The die head 5 comprises a number of subassemblies; namely, the outer or housing assembly 10, the internal or mandrel support assembly 11, and the torpedoes or spacer bodies 14 which support the two aforesaid assemblies in spaced apart relationship.

Mounted downstream of the die head 5 is the die set 6 which comprises a Konus ring 20 and bushing 21 as outer members and a mandrel or so-called pin 22 as an inner member. Bushing retainer 23 holds bushing 21 in place relative to Konus ring 20, which is supported on and secured to the support assembly 11 of the die head by a plurality of bolts 24 located in a well or recess 25 in the mandrel. The well is closed by plug 26 which is secured by screws 27.

The housing assembly 10 comprises inlet housing 30 and a restrictor ring 32 which latter is located between the inlet housing and Konus ring 20. Housing studs 33 are threaded into tapped holes in the Konus ring and with nuts 34 secure the housing 30 and ring 32 together and in alignment with the Konus ring 20. A flared entry passage 35 is centrally located in the upstream face of the housing 30 to admit plastic from the extruder.

Preferably the inlet housing 10 has a flat bottomed recess, the flat bottom 46 itself forming an outer radial inlet surface and the walls (preferably cylindrical) 47 forming an outer annulus surface which join up with a similar restrictor annulus surface 48 in the restrictor ring to form the outer part of an annular passage in the die head.

The die head mandrel support subassembly 11 comprises the spider ring 50 and the die restrictor ring 51 which are secured together by a plurality of bolts 52 extending from appropriate counterbored holes in the die ring 51 into tapped holes in spider ring 50. The spider ring preferably has a flat upstream face 53 which has a centrally located shallow cone well 54 in which a cone 55 is secured by appropriate bolts 56. The cone serves as a flow divider for plastic material received from extruder 1 through the orifice 57 which is the passageway through orifice ring 58 which is held in place by an entry adaptor 59 through the medium of a suitable plurality of studs and nuts 60, 61. A hole 62 forms a wire and air line passageway.

The die restrictor ring 51 of FIG. 2 has a restrictor surface 63 formed on the external surface thereof. The restrictor ring 51a of FIG. 5 has a bulge 63a that, like the FIG. 2 embodiment, cooperates with the outer annulus surface 48 to form an annular orifice or restriction 64, 64b which in the FIG. 5 embodiment also enhances the intensive mixing action of plastic material passing through the die and to do so immediately upstream of the die set, thereby encouraging the dispensing from the die head a substantially homogeneous mixture of plastic material which is substantially physically free of spider-line (seam) strata.

Each torpedo 14 is held in place by a pair of bolts 65 extending inwardly to the spider ring through counterbored holes in the torpedoes into tapped holes in spider ring 50. If desired, the torpedoes may be located relative to the mandrel support assembly by means of [screws] locator pins (not shown).

Two locator pins 66 extend from the spider ring 50 through torpedoes 14 into housing 30 and are preferably spaced 180° apart (FIG. 3). The number and size of bolts 68, studs 33, and bushing retainer bolts 67 required for holding together the assembly is determined by the pressure exerted by the plastic. This, of course, also has to do with the number of torpedoes spaced around the inlet opening.

On the upstream face of the die restrictor 51 in a position where it is internal of the mandrel support and not exposed to the plastic is a well 69 which serves as a convenient hidden receptacle for extra length wires for the thermocouple 70 and plug heater bands 72, and compressed air lines 74. As shown in FIG. 2, the compressed air line is advantageously secured to a suitable exit passage in the plug 26 whereby air is emitted to the interior of the pipe being extruded.

The substantially flat bottom 46 of the recess in the inlet housing cooperates with the substantially flat radial inlet surface 53 on the upstream end of the spider ring 50 to form a radial inlet passage 80 (FIG. 3). The cone 55 is so mounted and shaped as to fair itself smoothly and in a streamline fashion into the upstream face of the spider ring. Cone 55 forms in cooperation with the flared entry passage 35 a die head entry passage which directs plastic material from its point of receipt at the point of the cone into the radial inlet passage 80.

The torpedoes are preferably shaped as shown in FIG. 3 with narrow ends and a central portion substantially wider than the ends. There are holes through the torpedoes for the two pairs of bolts 65, 68 that are inserted through each. Bolts 68 helps hold the housing assembly 10 together. Screws 65 locate and hold the torpedoes to the spider during assembly and disassembly. Also, as shown in FIG. 3, a number of the torpedoes and adjacent parts of the housing 30 and spider ring 50 have holes 76 drilled through them in order to admit the air lines, wires, etc. 70, 72, 74 described above. Preferably, the mandrel plug 26 is heated by heaters 72 and the heat regulated by the thermocouple 70 located suitably within the plug.

The process of extruding pipe and similar rigid long hollow shapes embraced by this invention includes the step of plasticizing the material to be extruded by passing it through a suitable melting device such as the extruder 1, directing the plasticized material along a first path that includes the orifice 57 to where the material enters the die head at approximately the tip of the cone 55. At this point, the plasticated or plastified material divides and spreads out along the passageway between cone 55 and flared passage 35 and flows through inlet passage 80 through a first path that is in a radially outward fashion away from the axis of the path leading into the housing. This path carries the plasticated material past a ring of torpedoes 14 which preferably are arranged on radii and equidistant from the cone 55 and entry 35, that is in a ring about the entry way. The material continues to flow past the torpedoes 14 as illustrated in FIGS. 2 and 3, until it reaches the end of the radial passage 80 at which point it is turned approximately 90° to pass through the annular passageway 64 defined between the outer cylindrical walls of the mandrel support, including the restrictor ring 63 and the inner surfaces 47, 48 of the inlet housing subassembly.

The plastic material moves past the restrictor ring 51, then reaches the extruder passage in the die set which is designated here as passageway 82. The pipe issuing from the end of passageway 82 (to the left of FIG. 2) is substantially free of spider-lines and is the product which is recovered by passing through the remainder of the apparatus illustrated in FIG. 1.

The torpedoes 14, unlike conventional prior art spider webs (spokes) are substantially non-loadbearing — unlike conventional spokes which are in tension during operation.

External heaters with known types of thermostatic controls may be supplied as electric heater bands 85 around the outside of the housing assembly, the Konus ring, and the bushings as desired.

Figure 4:
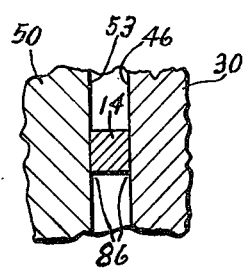
FIG. 4 is a localized section along 4—4 of FIG. 2.

Conventional centering screws 86 are provided to position the bushing relative to the Konus ring. Pilots (locating rings) 87 on each adjacent face of the several cylindrical members of die assembly 3 facilitate precise radial alignment. As noted in FIGS. 2 and 3, the cross-section of almost all parts is substantially circular whereby everything may be readily machined as by turning, internal boring, etc. For example, the housing and mandrel support assemblies 10, 11 are circular (see FIG. 3). The use of flat bottom and flat upstream faces on the housing assembly and mandrel support assembly 10, 11 respectively, to define the plastic flow path, not only provide simplified machining and great reduced costs, but they also provide sharp substantially 90° corners 86 (FIG. 4) (in the preferred embodiment) with reduced spider line formation problems at the junctions of such faces with the torpedoes 14.

Figure 5:
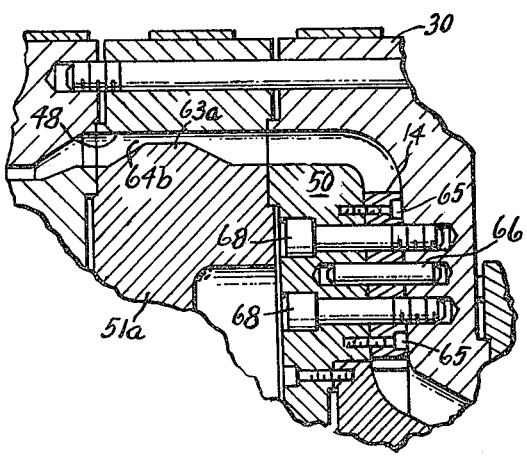
FIG. 5 is a modification of the FIG. 2 embodiment as a partial longitudinal cross-section.

The restrictor 63a of the FIG. 5 embodiment is preferred for large heavy wall pipe e.g. 20 inches outside diameter and one-fourth to three-fourths inch walls. However, the FIG. 5 cross-section of torpedo 14 shows in detail the preferred arrangement of bolts 65, 68 and locating pins 66 of which latter there are two positioned 180° apart as shown also in FIG. 3. This arrangement of bolts and pins 65, 68 and 66 is also preferred for the FIG. 2 embodiment.

A test has been run using an assembled unit constructed as above to make a 9.050 O.D. × .631 wall pipe of polyvinyl chloride. Observations of the product and tests thereon demonstrated that once the extruder, die head, die set were warmed up and at steady state, pipe was continuously produced having no visually discernible seams although there were striations in some areas due at least in part to alignment problems between the various parts. Modest processing temperatures (for PVC) in their range from about 360° F to about 380° F were used.

The invention claimed is:

1. A die head to which a die set is to be attached to form a unit for the extrusion of plastic pipe and comprising:
   a. a housing assembly having a recess, at the bottom of which recess is a substantially flat radial inlet surface having therein an opening that is a feed channel for the entrance of plastic material and an annulus surface connected substantially perpendicular to said inlet surface to form recess walls;
   b. a die head mandrel support assembly within said recess having as its major outside surfaces a flat radial inlet surface on one end, a radial die set mounting surface on the opposite end, and an annulus surface connecting them;
   c. said mandrel support assembly being disposed within said recess so that the respective aforesaid inlet surfaces are spaced apart and facing each other to form a radial inlet passage and the respective annulus surfaces are spaced apart and facing each other to form an annular passage that is connected to the downstream peripheral end of said radial inlet passage; and
   d. a plurality of torpedoes each having substantially flat mounting surfaces engaging said respective inlet surfaces radially disposed between and spacing apart said respective inlet surfaces; whereby plastic material entering through said inlet surface opening flows in a direction substantially parallel to the flow in said annular passage and substantially perpendicular to the flow in said radial inlet passage.

2. A die head according to claim 1 wherein both said inlet surfaces are substantially flat further comprising a feed channel for plastic through the wall of said housing forming said recess bottom and said torpedoes arranged in a ring around said feed channel.

3. A die head according to claim 1 wherein there is no fillet at the junctions of said torpedoes with said inlet surfaces.

4. A die head according to claim 1 wherein said opening comprises a diverging feed channel for entering material located centrally through said housing assembly; and a conical body supported with its base on said mandrel support assembly to extend into said feed channel.

5. A die head according to claim 4 wherein said housing assembly, mandrel support assembly, and conical body have generally circular cross sections lateral to the direction of material flow entering said feed channel whereby all of same may be easily shaped by turning.

6. A die head according to claim 1 wherein said housing and mandrel support assemblies have substantially circular cross section as viewed lateral to the direction of material entrance flow.

* * * * *